(12) United States Patent
Wada

(10) Patent No.: US 8,672,111 B2
(45) Date of Patent: Mar. 18, 2014

(54) VISCOUS COUPLING AND SUSPENSION APPARATUS

(75) Inventor: Yasuhiro Wada, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 920 days.

(21) Appl. No.: 12/677,315

(22) PCT Filed: Mar. 11, 2009

(86) PCT No.: PCT/JP2009/001095
§ 371 (c)(1),
(2), (4) Date: Mar. 10, 2010

(87) PCT Pub. No.: WO2010/103570
PCT Pub. Date: Sep. 16, 2010

(65) Prior Publication Data
US 2011/0147156 A1 Jun. 23, 2011

(51) Int. Cl.
*F16D 35/00* (2006.01)
*F16F 9/12* (2006.01)
*B60G 13/06* (2006.01)
*B60G 7/02* (2006.01)

(52) U.S. Cl.
USPC ............... 192/58.42; 192/103 R; 188/290

(58) Field of Classification Search
USPC ............... 192/58.42, 58.43, 103 R–105 F; 188/290, 71.5, 306, 130, 135, 181 R, 188/181 A
See application file for complete search history.

(56) References Cited

U.S. PATENT DOCUMENTS

| | | | | |
|---|---|---|---|---|
| 4,938,322 A | * | 7/1990 | Sugasawara et al. | 188/290 |
| 4,962,837 A | * | 10/1990 | Teraoka | 192/58.43 |
| 5,041,065 A | | 8/1991 | Kwoka | |
| 5,127,503 A | * | 7/1992 | Gratzer | 192/58.42 |
| 5,148,900 A | * | 9/1992 | Mohan | 192/58.42 |

(Continued)

FOREIGN PATENT DOCUMENTS

| | | |
|---|---|---|
| DE | 103 32 098 A1 | 3/2004 |
| JP | 54 165673 | 11/1979 |

(Continued)

OTHER PUBLICATIONS

International Search Report issued Apr. 7, 2009 in PCT/JP09/01095 filed Mar. 11, 2009.

(Continued)

*Primary Examiner* — David D Le
*Assistant Examiner* — Terry Chau
(74) *Attorney, Agent, or Firm* — Oblon, Spivak, McClelland, Maier & Neustadt, L.L.P.

(57) ABSTRACT

A viscous coupling includes a case body for forming a working chamber which contains the viscous fluid, a shaft inserted into the case body in such a manner that the shaft is relatively rotatable with respect to the case body, a plurality of inner plates coupled to the shaft, and a plurality of outer plates, coupled to the case body, which are arranged in the working chamber in such a manner as to be spaced apart from the inner plates with a pitch in an axial direction of the shaft. The pitch between each of the inner plates and each of the outer plates is adjustable by deforming either of the inner plates and the outer plates in response to the rotation speed of the shaft or the case body.

10 Claims, 9 Drawing Sheets

(56) References Cited

U.S. PATENT DOCUMENTS

| | | | |
|---|---|---|---|
| 5,259,488 A * | 11/1993 | Oberdorster et al. ...... 192/58.41 |
| 5,398,793 A * | 3/1995 | Stephens et al. ............ 192/58.4 |
| 2004/0045398 A1 | 3/2004 | Hayashi |

FOREIGN PATENT DOCUMENTS

| JP | 58-152941 A | 9/1983 |
|---|---|---|
| JP | 1 131348 | 5/1989 |
| JP | 2 62431 | 3/1990 |
| JP | 3-182832 A | 8/1991 |
| JP | 4-285336 A | 10/1992 |
| JP | 7 165148 | 6/1995 |
| JP | 8 166033 | 6/1996 |
| JP | 8-166033 A | 6/1996 |
| JP | 10 109528 | 4/1998 |
| JP | 10-109528 A | 4/1998 |
| JP | 10 109529 | 4/1998 |
| JP | 10-109529 A | 4/1998 |
| JP | 2803870 | 7/1998 |
| JP | 11-223233 A | 8/1999 |
| JP | 2003 4078 | 1/2003 |
| JP | 2005 172170 | 6/2005 |

OTHER PUBLICATIONS

Office Action issued Sep. 20, 2012, in German Patent Application No. 11 2009 004 796.3 (submitting English translation only).
English translation of International Preliminary Report on Patentability and Written Opinion of the International Searching Authority issued Oct. 18, 2011, in PCT/JP2009/001095.

* cited by examiner

VISCOUS COUPLING AND SUSPENSION APPARATUS

TECHNICAL FIELD

The present invention relates to a viscous coupling and a suspension apparatus incorporating the viscous coupling.

BACKGROUND TECHNOLOGY

A constitution has been known in the art that employs a viscous coupling as a roll damper (See Patent Document 1, for instance). The roll damper is such that a plurality of doughnut-shaped outer plates fixed to the inner peripheral surface of a hollow casing are alternately overlapped with a plurality of doughnut-shaped inner plates fixed to the outer peripheral surface of a rod (shaft) in a hollow casing, which is rotatably installed in relation to the rod, and also a silicone oil is encapsulated in the casing. And a damping force is created by the viscosity resistance of the encapsulated oil.
[Patent Document 1] Japanese Patent No. 2803870.
[Patent Document 2] Japanese Patent Application Publication No. Hei10-109529.
[Patent Document 3] Japanese Patent Application Publication No. Hei10-109528.
[Patent Document 4] Japanese Patent Application Publication No. Hei02-62431.

DISCLOSURE OF THE INVENTION

Problems to be Solved by the Invention

In view of the aforementioned circumstances, the present inventor has come to realize the following problem to be solved.

That is, a viscous coupling is such that inner plates and outer plates (hereinafter generically referred to as "plates" occasionally) rotate differentially from each other in a working chamber encapsulating a viscous fluid such as silicone oil and a torque is generated by shear force occurring in the viscous fluid due to the rotational difference. When the above-mentioned viscous coupling is incorporated into a suspension apparatus as a shock absorber, the torque thus generated becomes a damping force in the suspension apparatus. The damping force generated by the viscous coupling is determined by a plate interval (pitch), the overlapped area of the plates and the like.

Note here that the suspension characteristics of a suspension apparatus have an effect not only on the ride comfort but also on the steering stability of a vehicle. For example, the damping force of the shock absorber (damping force generating means), if set large, may improve the steering stability of the vehicle but may reduce the ride comfort. On the contrary, the damping force of the shock absorber, if set small, may reduce the steering stability of the vehicle but may improve the ride comfort. Therefore, both the steering stability and ride comfort of a vehicle can be improved, for instance, by setting the suspension characteristics as follows. That is, the damping force is made larger at low-range stroke speeds to ensure the steering stability, whereas it is made smaller at middle-to-higher-range stroke speeds to endure the ride comfort.

With the conventional viscous couplings, however, the plate pitch and the overlapped area of the plates have been fixed to predetermined values in a design stage. With the conventional viscous couplings, therefore, it has been only possible to generate the damping force in a proportional, or linear, relationship with the differential rotation speed of the plates and not possible to generate optimum damping forces in response to the differential rotation speed. Accordingly, if, for instance, the damping force is set small in order to assure riding comfort at middle-to-higher-range stroke speeds, there are possibilities that the damping force is insufficient at low-range stroke speeds. On the other hand, if the damping force is set high in order to assure steering stability at low-range stroke speeds, the damping force will tend to be too large at middle-to-higher-range stroke speeds.

The present invention has been made in view of the foregoing circumstances, and a purpose thereof is to provide a viscous coupling that can be employed suitably in a suspension apparatus.

Means for Solving the Problems

In order to resolve the foregoing problems, one embodiment according to the present invention provides a viscous coupling comprising: a case body for forming a working chamber which contains a viscous fluid; a shaft inserted into the case body, the shaft being relatively rotatable with respect to the case body; a plurality of first plates coupled to the shaft; and a plurality of second plates coupled to the case body and disposed in the working chamber, the second plates being spaced apart from the first plates with a pitch therebetween in an axial direction of the shaft, wherein the pitch between the first plates and the second plates is adjustable by deforming either of the first plates and the second plates in response to the rotation speed of the shaft or the case body.

According to this embodiment, the damping force can be varied in response to the rotation speed. Hence, a viscous coupling suitably employed in a suspension apparatus can be provided.

In the above-described embodiment, the first plate may have an inclined portion, the inclined portion being inclined in the axial direction as viewed in a cross-section parallel to an axis of the shaft, and a region including an open end and the inclined portion of the first plate may have a plurality of movable plates divided by slits extending radially with the shaft as a center thereof, wherein an end portion on an open-end side of the movable plate may have a greater mass than an end portion on a coupled-end side thereof, wherein the second plates may have a region opposite to the inclined portion of the first plate, the region extending in parallel to the inclined portion of the first plate, and wherein the pitch may vary in response to a deformation of the movable plates under a force working thereon by the rotation of the shaft or the case body. By employing this structure, the damping force can be varied in response to the rotation speed.

In the above-described embodiment, the first plate may have a thinner portion extending in a direction about the axis of the shaft within a range where the slits extend. By employing this structure, the first plate or second plate can be displaced more reliably in response to the rotation speed.

In the above-described embodiment, when the shaft and the case body are not rotating, the pitch between the first plate and one of the two neighboring second plates may be narrower than that between the first plate and the other of the second plates. By employing this structure, an excessive increase in damping force caused by an increase in rotation speed can be prevented.

In the above-described embodiment, the end portion on an open-end side of the movable plates may be such that one of end faces thereof in the rotational direction of the first plate is larger in area than the other thereof. By employing this structure, the damping force can be varied according to the rotational direction of the shaft or case body.

In the above-described embodiment, the end portion on an open-end side of the movable plate may be bent. This structure allows the viscous coupling to be formed more easily.

In the above-described embodiment, the first plate may include a minor plate provided integrally with or separately from a region on a shaft side of an open end of the second plate; the second plate may include a protruding portion which protrudes toward the shaft from the open end; and the protruding portion may face the minor plate with a pitch narrower than the pitch between the first plate and the second plate. This structure can allow the damping force to be generated to be adjusted in response to the angle of rotation of the shaft or case body and therefore is more suitably used in the suspension apparatus.

In the above-described embodiment, the minor plate and the protruding portion may be disposed such that the minor plate and the protruding portion face each other when the angle of rotation of the shaft with respect to the case body is in a marginal region of rotation range. By employing this structure, the damping force can be increased when the angle of rotation of the shaft or case body is in a marginal region of rotation range.

Another embodiment of the present invention relates to a suspension apparatus. This suspension apparatus includes a viscous coupling, according to any one of the above-described embodiments, as a damping force generating means for absorbing shocks to a vehicle when the vehicle is displaced up and down. By employing this suspension apparatus, the ride comfort and the steering stability are improved.

In the above-described embodiment, the first plate may include a minor plate provided integrally with or separately from a region on a shaft side of an open end of the second plate; the second plate may include a protruding portion which protrudes toward the shaft from the open end, the protruding portion facing the minor plate with a pitch narrower than the pitch between the first plate and the second plate; and the minor plate and the protruding portion may face each other when the vehicle is in an upper-end region or a lower-end region of displacement. This structure can reduce the bottoming and the topping of the vehicle.

In the above-described embodiment, the first plate may include an inclined portion inclined in the axial direction of the shaft as viewed in a cross-section parallel to the axis of the shaft, and a region including an open end of the first plate and the inclined portion may comprise a plurality of movable plates divided by slits extending radially with the shaft as a center thereof; an end portion on an open-end side of the movable plate may be such that the area of an end face on a side where the end portion advances by the rotation of the shaft due to an upward displacement of the vehicle is larger than the area thereof where it advances by the rotation of the shaft due to a downward displacement thereof.

Effect of the Invention

The present invention provides a viscous coupling that can be suitably used in a suspension apparatus.

DESCRIPTION OF THE REFERENCE NUMERALS

Figure 1:
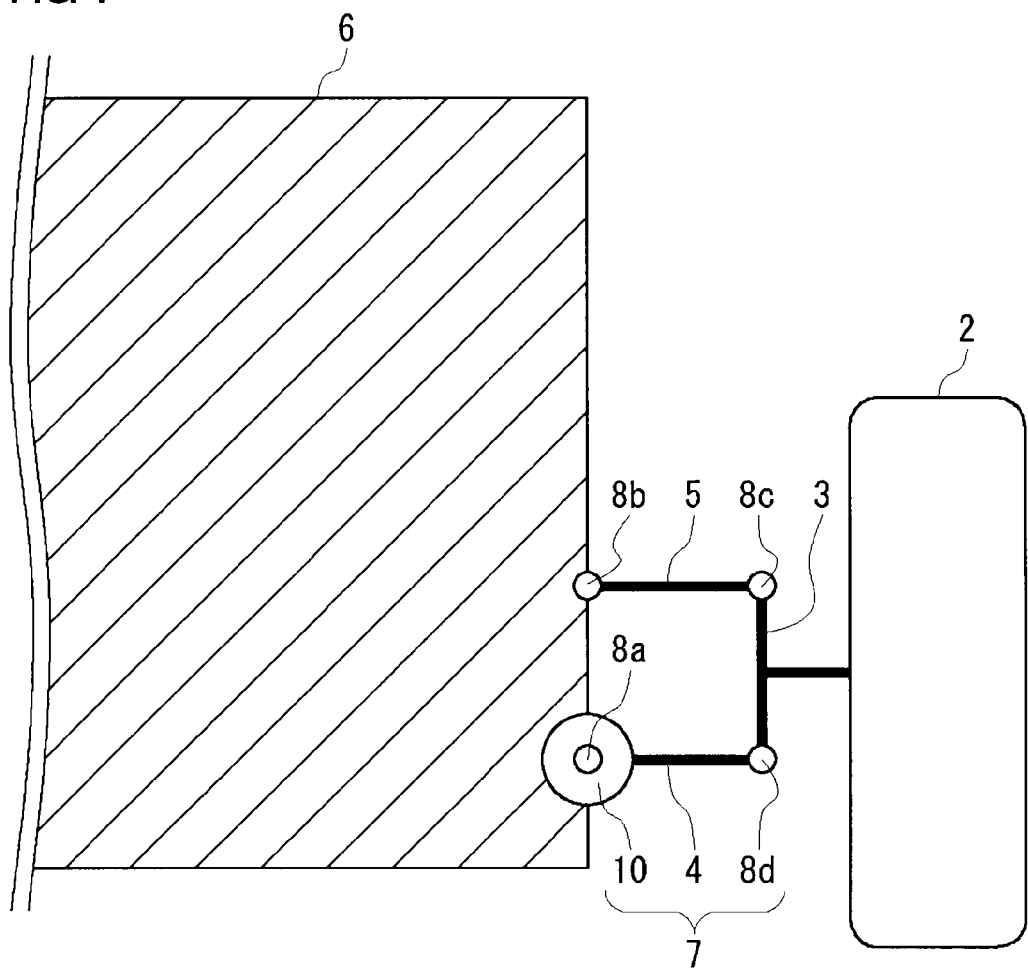
FIG. 1 shows a mounting structure of a suspension apparatus according to a first embodiment of the present invention.

1 Suspension apparatus
10 Viscous coupling
12 Case body
16 Working chamber
20 Shaft
30 Inner plate
30a Open end
32 Perpendicular portion
34 Inclined portion
35 Coupling portion
36 Weight portion
38 Minor plate
40 Movable plate
50 Outer plate
50a Open end
52 Perpendicular portion
54 Inclined portion
58 Protruding portion
70 Slit

BEST MODE FOR CARRYING OUT THE INVENTION

Hereinbelow, a detailed description will be given of best modes for carrying out the invention (hereinafter referred to embodiments) with reference to the accompanying drawings. Note that in the description of Figures the same reference numerals are assigned to the same components and the repeated description thereof is omitted as appropriate.

First Embodiment

FIG. 1 shows a mounting structure of a suspension apparatus according to a first embodiment of the present invention. As shown in FIG. 1, the suspension apparatus 1 includes a carrier 3 for rotatably supporting a wheel 2, and a lower arm 4 and an upper arm 5 for vertically swingably supporting the carrier 3. A vehicle body 6, a lower arm 4, an upper arm 5 and a carrier 3 constitute a link mechanism 7, and the lower arm 4 and the upper arm 5 are rotatably mounted on the vehicle body 6.

In the present embodiment, the suspension apparatus 1 is of a structure having a viscous coupling 10 at a joint of the link mechanism 7. Since the link mechanism 7 according to this embodiment is a 4-joint link mechanism, the viscous coupling 10 may be installed at any of a joint 8a between the vehicle body 6 and the lower arm 4, a joint 8b between the vehicle body 6 and the upper arm 5, a joint 8c between the upper arm 5 and the carrier 3, and a joint 8d between the lower arm 4 and the carrier 3. In the example shown in FIG. 1, the viscous coupling 10 constitutes the joint 8a between the vehicle body 6 and the lower arm 4. Hereinbelow, the joints 8a to 8d will be called "joints 8" or "joint 8" when they are referred to generically.

The viscous coupling 10 has a case body and a shaft inserted into the case body. The joints 8 coupling two adjacent links relatively rotatably are structured with the case body attached to a link and the shaft attached to another link adjacent to the former. In the example shown in FIG. 1, the case body is fixed to the vehicle body 6 and the shaft is coupled to the lower arm 4, so that damping forces are generated by relative rotation of the shaft and the case body in response to the up-and-down movement of the lower arm 4.

It is to be understood that in the present embodiment, the structure of the link mechanism 7 is an example and the suspension apparatus 1 may have any other link mechanism. Further, although, in the example shown in FIG. 1, a viscous coupling 10 constitutes the joint 8a, it may constitute any of the other joints 8b, 8c and 8d, or a plurality of viscous couplings 10 may constitute a plurality of joints 8.

Figure 2:
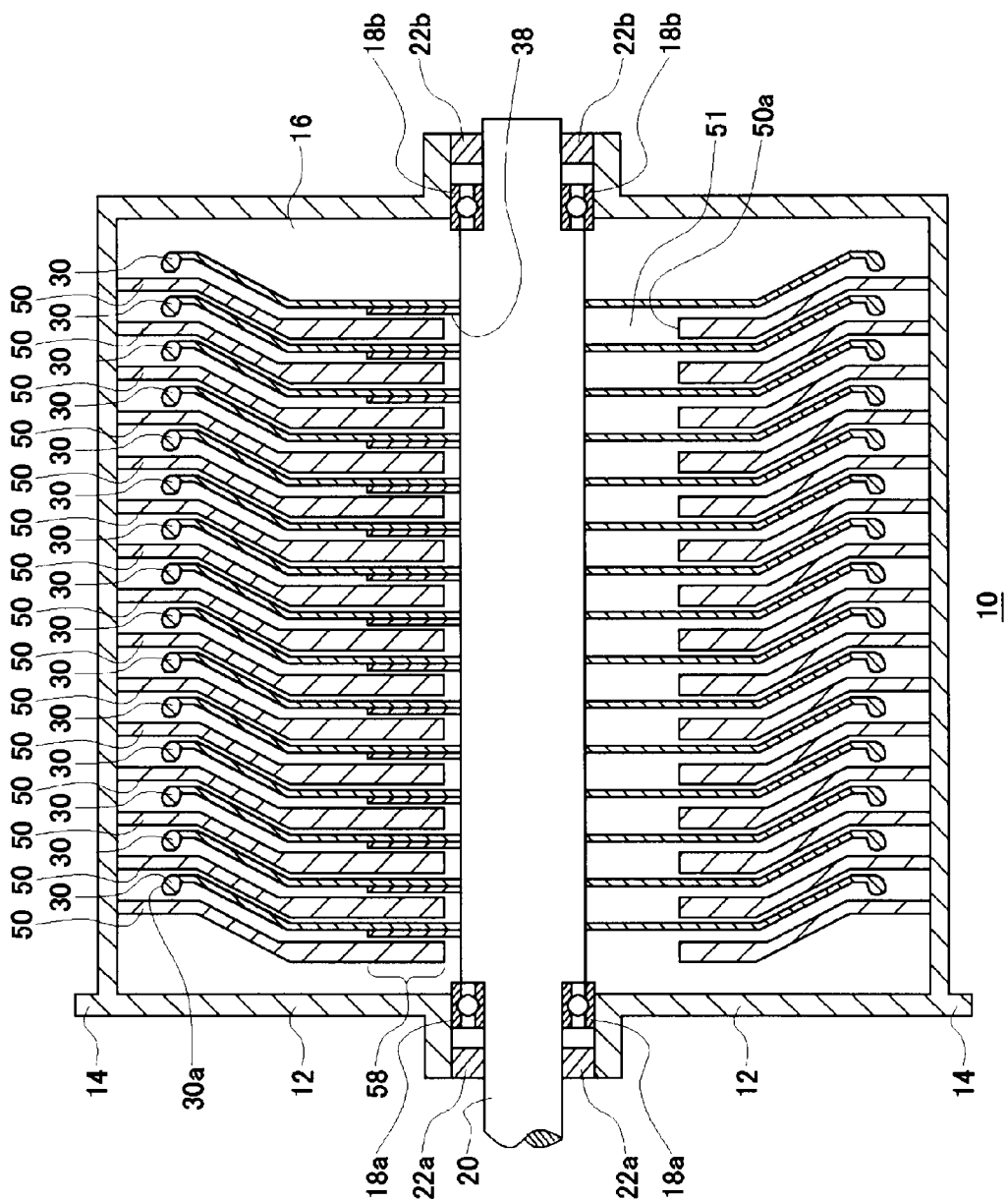
FIG. 2 is a schematic cross-sectional view of a viscous coupling according to a first embodiment.

FIG. 2 is a schematic cross-sectional view of a viscous coupling according to the first embodiment. The viscous coupling 10 includes a shaft 20 capable of rotating in response to the up-and-down movement of a lower arm 4 to which it is coupled (see FIG. 1) and a cylindrical case body 12 having the shaft 20 inserted therein. The shaft 20 is inserted relatively rotatably in the case body 12. The case body 12 is coupled to the vehicle body 6 (see FIG. 1) at an annular overhang 14. It is to be noted that the shaft 20 may be coupled to the vehicle body 6, and the case body 12 may be coupled to the lower arm 4. Or the shaft 20 and the case body 12 may be coupled to their respective links adjacent to each other in the link mechanism 7.

The shaft 20 is supported by bearings 18a and 18b relatively rotatably with respect to the case body 12. The case body 12 is a hollow cylindrical member, and a working chamber 16 is formed between the outer peripheral surface of the shaft 20 and the inner peripheral surface of the case body 12. The working chamber 16, which is filled with a viscous fluid such as silicone oil, is sealed by oil seals 22a and 22b.

Coupled to the outer peripheral surface of the shaft 20 are a plurality of inner plates 30 (first plates). Coupled to the inner peripheral surface of the case body 12 are a plurality of outer plates 50 (second plates). The plurality of inner plates 30 and the plurality of outer plates 50, which are both disk-shaped members, are disposed in the working chamber 16 at a predetermined interval (pitch) with each other in the axial direction of the shaft 20. In the present embodiment, the plurality of inner plates 30 and the plurality of outer plates 50 are disposed alternately in the working chamber 16. The diameter of the inner plates 30 is smaller than that of a circle formed by the inner peripheral surface of the case body 12, so that the end portions of the inner plates 30 on the side not coupled to the shaft 20 are each an open end 30a. Also, an opening 51 is formed in the center of the outer plates 50, where the shaft 20 is inserted. The diameter of the opening 51 is larger than that of the shaft 20, so that the end portions of the outer plates 50 on the side not coupled to the inner peripheral surface of the case body 12 are each an open end 50a.

Also, the inner plates 30 have each a minor plate 38 to be described later, and the outer plates 50 have each protruding portions 58 to be described later. The structures of the inner plates 30 and the outer plates 50 will be explained in detail later.

Here, a description will be given of a relationship between the differential rotation speed and the generated torque when a conventional viscous coupling is used in a suspension apparatus. When a viscous coupling is incorporated in a suspension apparatus as shown in FIG. 1, the differential rotation speed corresponds to the suspension stroke speed, and the generated torque corresponds to the damping force.

As the lower arm 4 (see FIG. 1) moves up or down following the behavior of a wheel 2 (see FIG. 1), the shaft rotates, causing a relative rotation of the shaft and the case body. As a result, the plurality of inner plates and the plurality of the outer plates coupled thereto, respectively, rotate differentially (relatively) with respect to each other, and a shear force occurs in the viscous fluid in response to the rotational difference, which in turn generates a torque (resistance). The torque thus generated works as a damping force in the suspension apparatus 1.

Shown below is a calculating formula of torque $T_0$ occurring in the viscous coupling.

$$T_0 = \frac{\pi^2 \cdot N \cdot e \cdot (r_a^4 - r_i^4) \cdot \Delta n}{Sn} \quad \text{(Equation 1)}$$

where
Sn: Plate interval (pitch)
N: Fluid viscosity (kinetic viscosity)
e: Density
$r_a$: Outside diameter of inner plate
$r_i$: Inside diameter of outer plate
$\Delta n$: Differential rotation speed.

The relationship between the differential rotation speed and the generated torque of the viscous coupling can be expressed by the following Equation 2 (equation of Couette flow).

$$\tau = \mu \frac{U}{h} \quad \text{(Equation 2)}$$

where
$\tau$: Resistance
$\mu$: Coefficient of friction
U: Rotational speed
h: Plate interval (pitch)

As is clear from Equation 1 and Equation 2, the torque (resistance $\tau$) in the viscous coupling occurs in inverse proportion to the size of the plate interval Sn (plate interval h). That is, the smaller the plate interval Sn (plate interval h) is, the larger the generated torque $T_0$ (resistance $\tau$) will be.

It is desirable that the suspension characteristics of a suspension apparatus be adjustable according to the stroke speed. For example, the suspension characteristics are desirably such that the steering stability can be assured at low-range stroke speeds and the ride comfort can be assured at middle-to-higher-range stroke speeds; for this purpose, it is preferable that the damping force be set larger at low-range stroke speeds and smaller at middle-to-higher range stroke speeds. With the conventional viscous couplings, however, it has been only possible to generate the damping force linearly because the plate interval (gap) and the overlapped area of the plates remain unchanged without regard to the differential rotation speed.

Thus the present inventor has devised an arrangement in which the pitch between a region constituting at least a part of each inner plate 30 and a region of each outer plate 50 opposite to said region is adjustable by deforming either of the inner plates 30 and the outer plates 50 in response to the rotation speed of the shaft 20 or the case body 12. As a result, the arrangement is such that the damping force to be generated is varied according to the differential rotation speed of the plates.

Figure 3A:
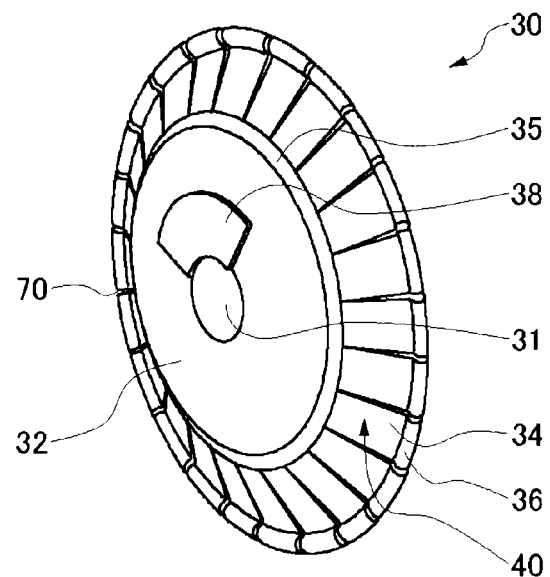
FIG. 3A is a schematic perspective illustration of an inner plate.
Figure 3B:
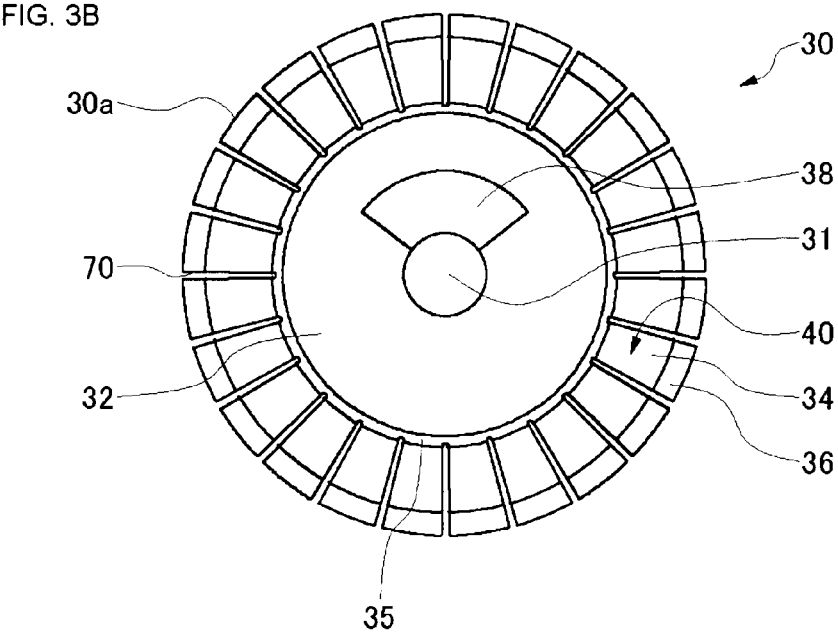
FIG. 3B is a schematic plan view of an inner plate.
Figure 3C:
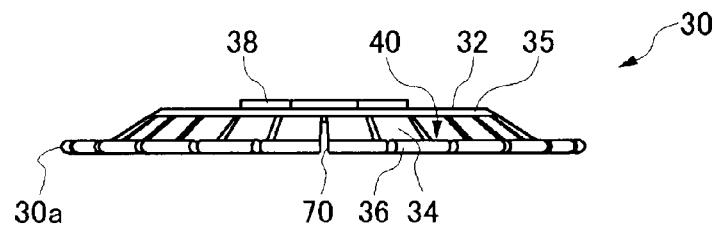
FIG. 3C is a schematic side view of an inner plate.
Figure 4A:
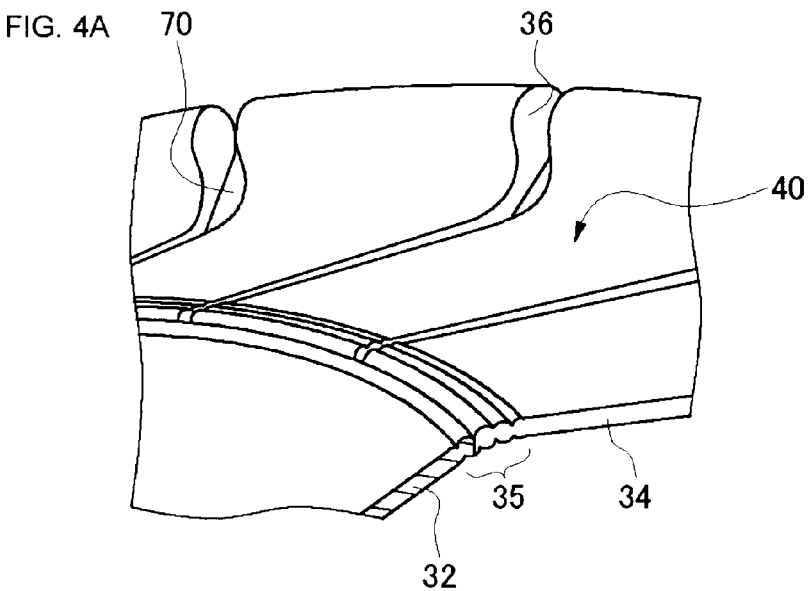
FIG. 4A is an enlarged view of a neighborhood of a movable plate of an inner plate.
Figure 4B:
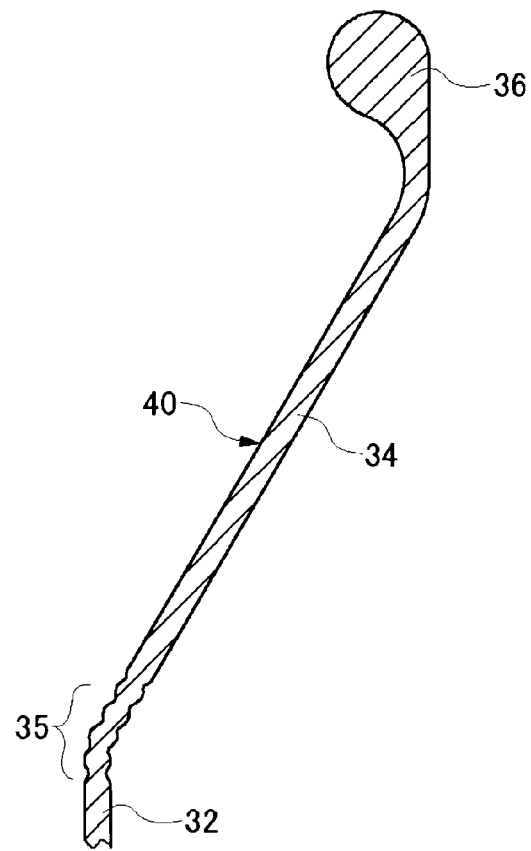
FIG. 4B is a schematic cross-sectional view of a neighborhood of a movable plate.
Figure 5A:
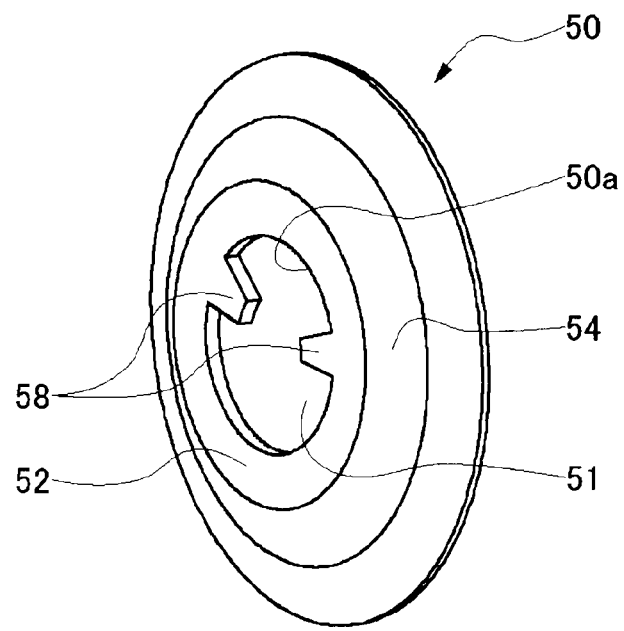
FIG. 5A is a schematic perspective illustration of an outer plate.
Figure 5B:
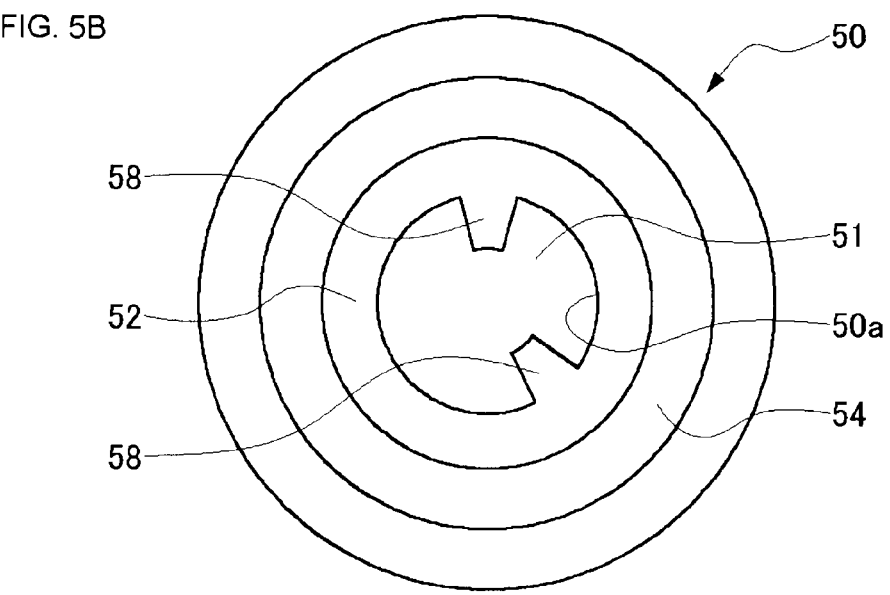
FIG. 5B is a schematic plan view of an outer plate.
Figure 5C:
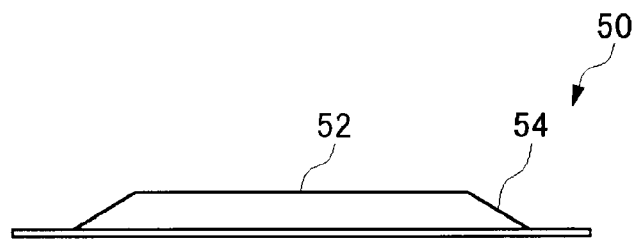
FIG. 5C is a schematic side view of an outer plate.

Now structures of the inner plates 30 and the outer plates 50 will be explained in detail. FIG. 3A is a schematic perspective illustration of an inner plate, FIG. 3B is a schematic plan view of an inner plate, and FIG. 3C is a schematic side view of an inner plate. FIG. 4A is an enlarged view of a neighborhood of a movable plate of an inner plate, and FIG. 4B is a schematic cross-sectional view of a neighborhood of a movable plate. FIG. 5A is a schematic perspective illustration of an outer plate, FIG. 5B is a schematic plan view of an outer plate, and FIG. 5C is a schematic side view of an outer plate.

As shown in FIGS. 3A to 3C, an opening 31 is provided in the center of an inner plate 30 through which a shaft 20 is inserted. The inner plate 30 includes a perpendicular portion 32, an inclined portion 34, a coupling portion 35, a weight portion 36, and a minor plate 38.

The perpendicular portion 32 extends in a direction perpendicular to the axis of the shaft 20 with the inner plate 30 coupled to the shaft 20. An inner end of the perpendicular portion 32, which is the coupled end of the inner plate 30, is coupled to the shaft 20. The outer end of the perpendicular portion 32, i.e., the end on a case body 12 side, is coupled to the inclined portion 34 through the medium of the coupling portion 35.

The inclined portion 34, which is inclined in the axial direction of the shaft 20 as viewed in a cross-section parallel to the axis of the shaft 20, is provided encircling the axis of the shaft 20. The inclined portion 34 is coupled to the outer end of the perpendicular portion 32 through the medium of the coupling portion 35. Thus the inner plate 30 is approximately in an umbrella or dish form.

The coupling portion 35 couples the outer end of the perpendicular portion 32 with the inner end of the inclined portion 34. As shown in FIGS. 4A and 4B, the coupling portion 35 has dents in the thickness direction on both faces thereof as viewed in a cross-section parallel to the axis of the shaft 20, so that constricted (thinner) portions extending in a direction encircling the axis of the shaft 20 are formed thereon. The coupling portion 35 in this embodiment is bellows-shaped with a plurality of constrictions provided. The constrictions are provided around the whole circumference encircling the axis of the shaft 20. The constrictions provided in the coupling portion 35 make it easier for the movable plates 40 to be displaced in the axial direction of the shaft 20 as will be described later.

Coupled to the outer end of the inclined portion 34 is the weight portion 36. The outer end of the weight portion 36 is the open end 30a of the inner plate 30. The weight portion 36 is greater in thickness than the perpendicular portion 32 and the inclined portion 34. With the weight portion 36 thus provided, an outer end (an end on the open-end side) of the movable plate 40 to be discussed later has a greater mass than an inner end (an end on the coupled-end side) thereof.

The minor plate 38, which is a member having a sectorial shape in plan view, is provided integrally with or separately from the inner plate 30 in a position on the shaft 20 side of the open end 50a of the outer plate 50. In other words, the inner plate 30 is greater in thickness in a region where the minor plate 38 is provided. The minor plate 38 is such that an inner end thereof is coupled to the shaft 20 and an outer end thereof lies in a region inside of the open end 50a. Also, the minor plate 38 is located in a predetermined region in a direction encircling the axis of the shaft 20 of the perpendicular portion 32 and faces the protruding portion 58 with a pitch narrower than the plate interval between the inner plate 30 and the outer plate 50 (see FIG. 2).

The region of the inner plate 30 including the open end 30a and the inclined portion 34 is comprised of a plurality of movable plates 40 divided by slits 70 extending radially with the shaft 20 as the center thereof. In the present embodiment, the slits 70 extend from the open end 30a to the coupling portion 35, and the movable plates 40, which have the end thereof on the opposite side of the open end thereof (the end on the shaft 20 side) coupled to the coupling portion 35, can be displaced in the axial direction of the shaft 20 with an end thereof on the coupling portion 35 side thereof serving as a fulcrum. As described earlier, the movable plates 40 are heavier in the end thereof on the open-end side. Therefore, the movable plates 40 can be easily displaced in the axial direction of the shaft 20 with the end thereof on the coupling portion side serving as the fulcrum when an inertial or centrifugal force works thereon on account of the relative rotation of the shaft 20 and the case body 12. As described earlier, the coupling portion 35 is provided with constrictions, so that the movable plates 40 can be more easily displaced in the axial direction of the shaft 20 with the end thereof on the coupling portion 35 side serving as the fulcrum.

It is to be understood that the slits 70 may extend to the perpendicular portion 32 and the perpendicular portion 32 may constitute a part of the movable plates 40. Further, it may be so arranged that the slits 70 extend to the coupled end of the inner plate 30 and the movable plates 40 extend from the open end 30a to the coupled end of the inner plate 30. Also, the inner plate 30 may not include the perpendicular portion 32, and the inclined portion 34 may extend to the shaft 20. It is to be noted that the positions of the constrictions are not limited to the coupling portion 35 but may be anywhere within the range where the slits 70 extend in the radial direction of the inner plate 30.

As shown in FIGS. 5A to 5C, an outer plate 50 includes a perpendicular portion 52, an inclined portion 54, and protruding portions 58.

The perpendicular portion 52 extends in a direction perpendicular to the axis of the shaft 20 with the outer plate 50 coupled to the case body 12. An inner end of the perpendicular portion 52, namely an end on the shaft 20 side, is an open end 50a of the outer plate 50. The outer end of the perpendicular portion 52 is coupled to the inclined portion 54.

The inclined portion 54, provided in a region where it faces the inclined portion 34 of the inner plate 30, is inclined in such a manner as to extend in parallel with the inclined portion 34. The inclined portion 54 is coupled to the outer end of the perpendicular portion 52.

The protruding portions 58, which are each approximately sectorial in plan view, protrude toward the shaft 20 from the open end 50a of the outer plate 50. The protruding portions 58 are such that the outer end thereof is coupled to the open end 50a and the inner end thereof lies within the opening 51 in such a manner that it does not interfere with the shaft 20. In the present embodiment, there are two protruding portions 58 which are provided in predetermined positions in a direction encircling the axis of the shaft 20 and face the minor plate 38 with a pitch (space) narrower than the plate interval between the inner plate 30 and the outer plate 50 (see FIG. 2).

Note here that the minor plate 38 and the protruding portions 58 are disposed on the perpendicular portion 32 of the inner plate 30 and the open end 50a of the outer plate 50, respectively, such that they face each other when the angle of rotation of the shaft 20 with respect to the case body 12 is in a marginal region of rotation range. In a suspension apparatus 1 incorporating a viscous coupling 10, the minor plate 38 and the protruding portions 58 are located in their respective positions where they face each other when the vehicle is substantially in the upper-end region or the lower-end region of displacement, that is, in the upper- or lower-limit region of stroke.

Locating the minor plate 38 and the protruding portions 58 in positions as described enables a damping force to be generated between the minor plate 38 and the protruding portions 58 when the angle of rotation of the shaft 20 reaches a marginal region of rotation range. And since the minor plate 38 and the protruding portions 58 face each other with a pitch narrower than the pitch between the inner plate 30 and the outer plate 50, the damping force increases as the angle of rotation of the shaft 20 reaches the marginal region of rotation range. For this reason, the suspension apparatus 1 incorporating the viscous coupling 10 can increase the damping force when the vehicle reaches the upper-end or the lower-end of displacement, thereby preventing the bottoming or topping of the vehicle. This improves the ride comfort of the vehicle.

Figure 6A:
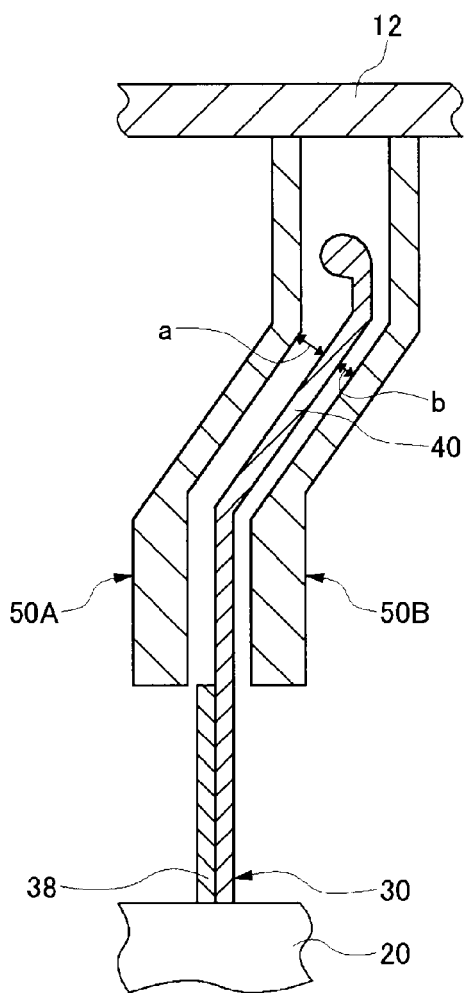
FIG. 6A is a schematic cross-sectional view showing a state in which a shaft and a case body are not rotating.
Figure 6B:
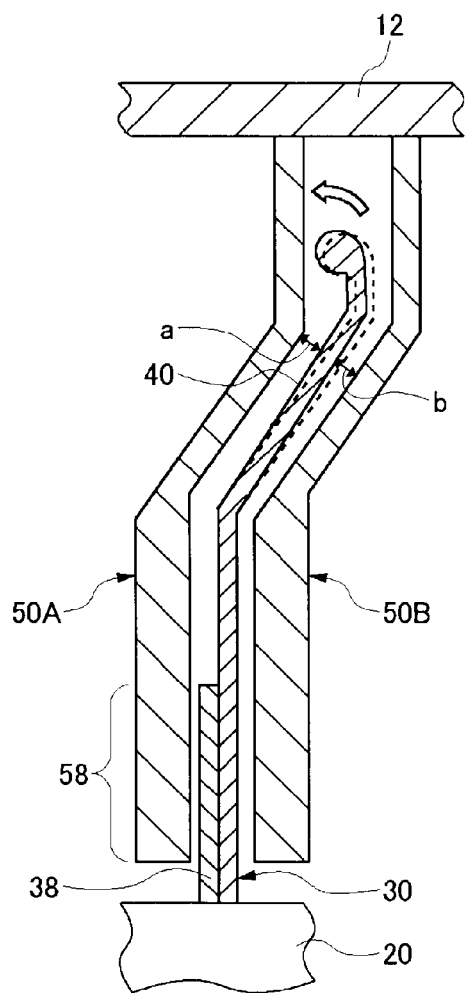
FIG. 6B is a schematic cross-sectional view showing a state in which a shaft and a case body have rotated.
Figure 7A:
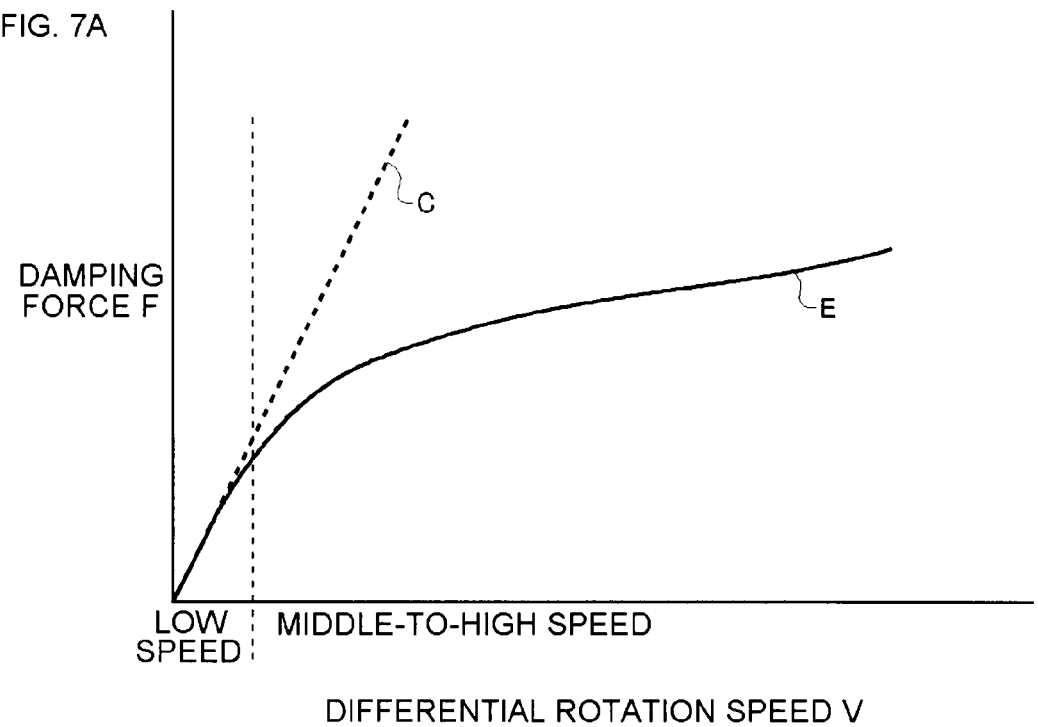
FIG. 7A is a graph showing a relationship between a differential rotation speed v and a damping force F of shaft and case body.
Figure 7B:
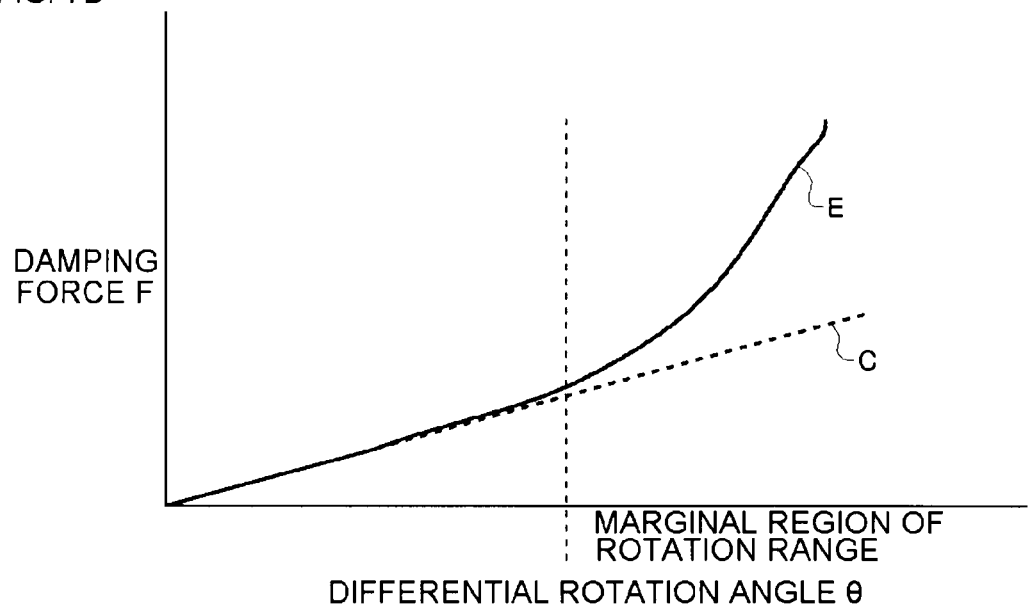
FIG. 7B is a graph showing a relationship between a differential rotation angle θ and a damping force F of shaft and case body.

Next, an operation of a viscous coupling 10 provided with the above-described arrangement will be explained. FIG. 6A is a schematic cross-sectional view showing a state in which the shaft and the case body are not rotating, and FIG. 6B is a schematic cross-sectional view showing a state in which the shaft and the case body have rotated. Shown in FIG. 6A and FIG. 6B is a neighborhood of a movable plate 40 of an inner plate 30. FIG. 7A is a graph showing a relationship between the differential rotation speed v and the damping force F of the shaft and case body, and FIG. 7B is a diagram showing a relationship between the differential rotation angle θ and the damping force F of the shaft and case body. In FIG. 7A and FIG. 7B, the solid lines E represent the damping force characteristics of a viscous coupling 10 according to the present embodiment, and the dotted lines C represent the damping force characteristics of a conventional viscous coupling.

As shown in FIG. 6A, when the shaft 20 and the case body 12 are not rotating, the inner plate 30 is so disposed as to have different pitches between itself and the two neighboring outer plates 50. That is, the pitch between the inner plate 30 and one of the two neighboring outer plates 50 is narrower than that between the inner plate 30 and the other of the outer plates 50. To be more specific, the pitch b between the inner plate 30 and the outer plate 50B from which the movable plate 40 being displaced moves away (the right-hand outer plate in FIG. 6A) is narrower than the pitch a between the inner plate 30 and the outer plate 50A to which the movable plate 40 being displaced moves closer (the left-hand outer plate in FIG. 6A). For example, the pitch b is about 1 mm, and the pitch a is about 1.4 mm.

As the lower arm 4 (see FIG. 1) moves up or down, the shaft 20 rotates, causing a relative rotation of the shaft 20 and the case body 12. As a result, the plurality of inner plates 30 and the plurality of outer plates 50 coupled thereto, respectively, rotate differentially. When the differential rotation speed is in the low-speed range, the inertial force working on the inner plate 30 is small, so that the inner plates 30 rotate in the state as shown in FIG. 6A. Then mainly a damping force occurs between the inner plate 30 and the outer plate 50B which is disposed with the pitch b relative to the inner plate 30. Thus, as shown in FIG. 7A, when the differential rotation speed is in the low-speed range, damping forces are generated linearly in proportion to the differential rotation speed. Note that there occurs little damping force between the inner plate 30 and the outer plate 50A which is disposed with the pitch a relative to the inner plate 30.

When the differential rotation speed increases, the inertial force working on the inner plate 30 becomes larger. And when the differential rotation speed enters the middle-to-high-speed range, the movable plate 40 begins to be displaced in the axial direction of the shaft 20 (in the direction of the white arrow in FIG. 6B) with the end thereof on the coupling portion 35 side as the fulcrum. Along with it, the pitch b between the inner plate 30 and the outer plate 50B grows wider. The amount of displacement of the movable plate 40 increases with the rise in differential rotation speed, and accordingly the pitch b grows wider with the increase in differential rotation speed. As a result, in the middle-to-high-speed range, the damping force does not increase linearly along with the increase in differential rotation speed as is shown in FIG. 7A. Thus an excessive increase in damping force in the middle-to-high-speed range is prevented. Since the movable plate 40 is displaced gradually with the increase in differential rotation speed, the damping force changes smoothly as the differential rotation speed shifts from the low-speed range to the middle-to-high-speed range or from the middle-to-high-speed range to the low-speed range. Thus, the loss of riding comfort due to abrupt changes of damping force can be prevented.

The movable plate 40 is displaced, for instance, until the pitch a and the pitch b between the region of the inclined portion 34 at the shortest distance to the approaching outer plate 50A and the outer plates 50A and 50B, respectively, are almost equal to each other when the amount of displacement is maximum. For example, when the pitch b is about 1 mm and the pitch a is about 1.4 mm, the maximum amount of displacement is about 0.2 mm and therefore the pitch a and the pitch b with the movable plate being displaced are both about 1.2 mm. It is to be noted that as the amount of displacement of the movable plate 40 increases, the pitch a between the inner plate 30 and the outer plate 50A grows narrower and damping forces begin to occur between the inner plate 30 and the outer plate 50A. However, even when the amount of displacement of the movable plate 40 is at its maximum, that is, even when the damping force occurring between the inner plate 30 and the outer plate 50A is at its maximum, the total of the damping force occurring between the inner plate 30 and the outer plate 50A and the damping force occurring between the inner plate 30 and the outer plate 50B will not surpass the damping force occurring in a conventional viscous coupling.

As the differential rotation angle of the case body 12 and the shaft 20 increases, the minor plate 38 and the protruding portion 58 begin to overlap each other, and along with the increase in the differential rotation angle, the overlapped region of the minor plate 38 and the protruding portion 58 keeps increasing. Note here that, as is clear from Equation 1, the torque occurs in the viscous coupling to present a relation that is proportional to the difference between the fourth power of the outside diameter $r_a$ of the inner plate and the fourth power of the inside diameter $r_i$ of the outer plate. That is, seen from the axial direction of the shaft 20, the torque occurs in proportion to the size of the region where the two differentially rotating plates overlap each other. Therefore, the larger the overlapped region of the minor plate 38 and the protruding portion 58 becomes, the larger the damping force occurring between the minor plate 38 and the protruding portion 58 will be. Hence, as shown in FIG. 7B, the damping force rises up when the differential rotation angle is in the marginal region of rotation range. Note that the size of the overlapped region of the minor plate 38 and the protruding portion 58 increases gradually with the increase in differential rotation angle such that the damping force changes smoothly at the boundary of marginal region of rotation range. Thus, the loss of riding comfort due to abrupt changes of damping force can be prevented.

It should be appreciated that the low-speed range and the middle-to-high-speed range of differential rotation speed as well as the marginal regions of rotation range of differential rotation angle shall be set as appropriate to improve the ride comfort and the steering stability of the vehicle and therefore a designer can set them as appropriate based on his/her simulations and various other experiments.

Next, an example of assembling method of a viscous coupling 10 will be explained.

Firstly, a case body 12 is placed in such a position that the opening comes to the top with a not-shown cover out. Then a shaft 20 is inserted in such a manner as to penetrate an oil seal 22b and a bearing 18b. Following this, an inner plate 30, on which a minor plate 38 is mounted in advance, is fitted on the shaft 20 and fixed in a predetermined position. Next an outer plate 50 is mounted and fixed in a predetermined position on the case body 12. This process is repeated until all the inner plates 30 and the outer plates 50 are mounted. Then silicone oil as the viscous fluid is filled into the enclosure of the case body 12 and the cover is installed to complete the assembly of the viscous coupling 10. It is to be noted that a viscous coupling 10 may be formed by filling silicone oil through an oil hole after installing the cover and then sealing the oil hole.

To sum up the operations performed in relation to and the advantages achieved by the structure as heretofore described, the viscous coupling 10 according to the present embodiment uses the deformation of the inner plates 30 in response to the rotation speed of the shaft 20 or the case body 12. And this arrangement enables the adjustment of the pitch (interval) between the inner plate 30 and the outer plate 50. Hence, the damping force can be adjusted in response to the differential rotation speed of the shaft 20 and the case body 12 with the result that the viscous coupling according to the present embodiment can be suitably used in a suspension apparatus.

Specifically, an inner plate 30 has a plurality of movable plates 40 divided by slits 70, and a movable plate 40 is bent in the axial direction of the shaft 20 to form an inclined portion 34. Also, the movable plate 40 is provided with a weight portion 36 on the open-end side thereof. Also, an outer plate 50 has an inclined portion 54 extending in parallel with the inclined portion 34. And the movable plate 40 is displaced to open outward by the inertial force working thereon in response to the rotation of the shaft 20 or the case body 12, thereby changing the pitch (interval) between the inner plate 30 and the outer plate 50. The structure as described above can also adjust the damping force in response to the differential rotation speed of the shaft 20 and the case body 12.

The inner plate 30 includes a perpendicular portion 32, to which a movable plate 40 is coupled through the medium of a coupling portion 35. And the coupling portion 35 is bellows-shaped with constrictions, which makes it easier for the movable plate 40 to be displaced. As a result, the movable plate 40 can be displaced more reliably in response to the differential rotation speed, and the amount of displacement of the movable plate 40 can be adjusted more freely. When the shaft 20 and the case body 12 are not rotating, the pitch between the inner plate 30 and one of the two neighboring outer plates 50 is narrower than that between the inner plate 30 and the other of the outer plates 50. Accordingly, when the differential rotation speed is in the middle-to-high-speed range, the damping force may be generated with a saturation-type characteristic in which the increment of the damping force decreases gradually in relation to the differential rotation speed. Thus it is possible to prevent an excessive increase in damping force in the middle-to-high-speed range and generate an optimum damping force in response to the differential rotation speed.

The inner plate 30 includes a minor plate 38 in a region inside of the open end 50a of the outer plate 50, and the outer plate 50 includes protruding portions 58 protruding from the open end 50a thereof. And the minor plate 38 and the protruding portions 58 face each other with a pitch narrower than the interval between the inner plate 30 and the outer plate 50. Accordingly, a greater damping force can be generated when the minor plate 38 and the protruding portion 58 overlap each other with the rotation of the shaft 20 or the case body 12. Thus an optimum damping force can be generated in response to the differential rotation angle. Particularly if the minor plate 38 and the protruding portion 58 are located in such positions as to face each other when the rotation angle of the shaft 20 is in the marginal region of rotation range, the damping force can be increased when the rotation angle of the shaft 20 reaches the marginal region. When the viscous coupling 10 is used in a suspension apparatus 1, it is possible to reduce the topping or bottoming of the vehicle by locating the minor plate 38 and the protruding portions 58 in such positions as to face each other when the vehicle is at the upper end or the lower end of displacement.

Furthermore, the suspension apparatus 1 according to the present embodiment employs a viscous coupling 10 that can adjust the damping force according to the differential rotation speed as a damping force generating means for absorbing shocks to the vehicle when it is displaced up and down. This assures improvement in both the ride comfort and steering stability of the vehicle.

Second Embodiment

A viscous coupling according to a second embodiment differs from the first embodiment in the shape of the weight portion provided in the inner plate. A description is given herinbelow of the second embodiment. Note that the structure of a suspension apparatus, the other structural components of a viscous coupling, the assembly method for the viscous coupling, and so forth are basically the same as those of the first embodiment. The structural components identical to those in the first embodiment are denoted with the same reference numerals as those therein, and the repeated description thereof will be omitted as appropriate.

Figure 8B:
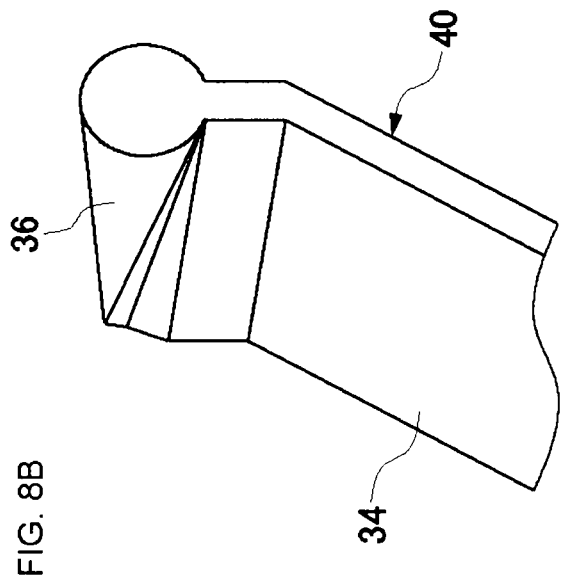
FIG. 8B is an enlarged view viewed from a different angle.
Figure 8A:
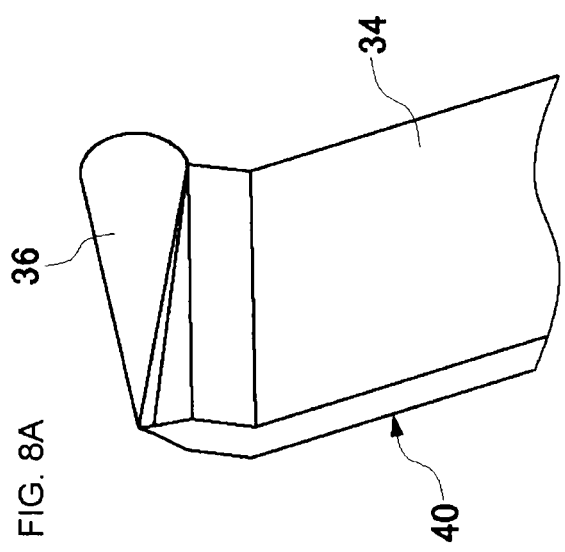
FIG. 8A is an enlarged view of an open-end neighborhood of a movable plate in a viscous coupling according to a second embodiment.

FIG. 8A is an enlarged view of an open-end neighborhood of a movable plate in the viscous coupling according to the second embodiment, and FIG. 8B is an enlarged view viewed from a different viewpoint.

Though omitted in the Figures, a viscous coupling 10 according to the second embodiment includes a shaft 20 and a case body 12, similarly to the first embodiment. The shaft 20 is supported relatively rotatably with respect to the case body 12. The case body 12 is a hollow cylindrical member, and a working chamber 16 is formed between the outer peripheral surface of the shaft 20 and the inner peripheral surface of the case body 12 and is filled with a viscous fluid such as silicone oil. Coupled to the outer peripheral surface of the shaft 20 are a plurality of inner plates 30 (first plates). Coupled to the inner peripheral surface of the case body 12 are a plurality of outer plates 50 (second plates). The plurality of inner plates 30 and the plurality of outer plates 50 are disposed in the working chamber 16 at a predetermined interval with each other in the axial direction of the shaft 20. In the present embodiment, the plurality of inner plates 30 and the plurality of outer plates 50 are disposed alternately in the working chamber 16.

The inner plate 30 includes a perpendicular portion 32, an inclined portion 34, a coupling portion 35, a weight portion 36, and a minor plate 38. The perpendicular portion 32 extends in a direction perpendicular to the axis of the shaft 20.

The inclined portion 34 is inclined in the axial direction of the shaft 20. The coupling portion 35 couples the outer end of the perpendicular portion 32 with the inner end of the inclined portion 34. Constricted (thinner) portions extending in a direction encircling the axis of the shaft 20 are formed on the coupling portion 35. Coupled to the outer end of the inclined portion 34 is the weight portion 36. With the weight portion 36 thus provided, the outer end of the movable plate 40 has a greater mass than the inner end thereof. The minor plate 38 is provided integrally with or separately from the inner plate 30 in a position on the shaft 20 side away from the open end 50a of the outer plate 50. The inner plate 30 is comprised of a plurality of movable plates 40 divided by slits 70 extending radially with the shaft 20 as the center thereof. The movable plates 40, which have the end thereof on the opposite side of the open end thereof coupled to the coupling portion 35, can be displaced in the axial direction of the shaft 20 with an end thereof on the coupling portion 35 side serving as a fulcrum.

An outer plate 50 includes a perpendicular portion 52, an inclined portion 54, and protruding portions 58. The perpendicular portion 52 extends in a direction perpendicular to the axis of the shaft 20. The inclined portion 54, provided in a region where it faces the inclined portion 34 of the inner plate 30, is inclined in such a manner as to extend in parallel with the inclined portion 34. The inclined portion 54 is coupled to the outer end of the perpendicular portion 52. The protruding portions 58 protrude toward the shaft 20 from the open end 50a of the outer plate 50.

The minor plate 38 and the protruding portions 58 are disposed in the inner plate 30 and the outer plate 50, respectively, such that they face each other when the angle of rotation of the shaft 20 with respect to the case body 12 is in a marginal region of rotation range. In a suspension apparatus 1 incorporating a viscous coupling 10, the minor plate 38 and the protruding portions 58 are located in their respective positions where they face each other when the vehicle is substantially in the upper-end region or the lower-end region of displacement. The minor plate 38 and the protruding portions 58 face each other with a pitch narrower than the pitch between the inner plate 30 and the outer plate 50.

According to the second embodiment, in the end portion on the open-end side of the movable plate 40, namely in the weight portion 36, one of end faces of the weight portion 36 in the rotational direction of the inner plate 30 is larger in area than the other thereof. Specifically, the weight portion 36 is formed in an approximately conical shape, and is of a shape such that the bottom face and the tip thereof are so arranged as to be set along the rotational direction of the inner plate 30. The shape of the weight portion 36 is not particularly limited thereto and, for example, may be a quadrangular pyramid.

Note that the torque occurring in the viscous coupling can be expressed using the following Equation 3.

$$F = C_d \frac{1}{2} \rho V^2 A \quad \text{(Equation 3)}$$

where
F: Generated torque
$C_d$: Resistance coefficient
ρ: Fluid density
V: Rotational speed
A: Area of an object as viewed from a travelling direction thereof.

As is clear from Equation 3, the larger the resistance coefficient $C_d$ is, the larger the generated torque will be. In terms of improvement in the ride comfort of a vehicle, the suspension characteristics of a suspension apparatus are preferably such that the damping force is high when the vehicle moves upward with respect to the road surface, namely in an expanded state (expansion side) and such that the damping force is low when the vehicle moves downward with respect to the road surface, namely in a pressurized state (pressure side). However, since the plates are of simple disk shape in the conventional viscous couplings, the damping force cannot be made to differ at between the expansion side and the pressure side.

On the contrary to this conventional practice, the viscous coupling 10 according to the present embodiment has movable plates 40, and a conically shaped weight portion 36 is provided in an open end of a movable plate 40. The resistance coefficient of viscous fluid when the viscous fluid flows to a tip side from a bottom face side of a cone is larger than that when it flows from the tip side to the bottom face side thereof. For example, when the viscous fluid flows to the tip side from the bottom face side of a cone, the resistance coefficient is about 1.1, whereas when it flows to the bottom face side from the tip side thereof, the resistance coefficient is about 0.5. Thus, by employing the viscous coupling 10 according to the present embodiment, the damping force to be generated can be made to differ from each other according to the rotational direction of the inner plate 30, namely the rotational direction of the shaft 20 or case body 12. The area A is equal to the area of the bottom face of a cone irrespective of the rotational directions of the inner plate 30.

In the present embodiment, the bottom face of a cone is set to a direction in which the weight portion 36 advances by the rotation of the shaft 20 due to an upward displacement of a vehicle, whereas the tip thereof is set to a direction in which it advances by the rotation of the shaft 20 due to a downward displacement of a vehicle. As a result, when a vehicle is displaced toward the expansion side, a relatively large damping force can be generated, whereas when it is displaced toward the pressure side, a relatively small damping force can be generated.

To sum up the operations performed in relation to and the advantages achieved by the structure as heretofore described, in the viscous coupling 10 according to the present embodiment, one of end faces thereof on an open end side of the movable plate 40 in the rotational direction of the inner plate 30 is larger in area than the other thereof. Thus, the second embodiment achieves the following effect in addition to the effect achieved by the first embodiment. That is, the damping force can be varied according to the rotational direction of the inner plate 30. In other words, since the viscous coupling according to the second embodiment can suitably generate the damping force according to the rotational direction of the shaft 20 or case body 12, this viscous coupling can be suitably used in a suspension apparatus.

Also, the area of an end face on a side where the weight portion 36 advances by the rotation of the shaft 20 due to a displacement of a vehicle toward the expansion side is set larger than the area thereof where it advances by the rotation of the shaft 20 due to a displacement thereof toward the pressure side. This enables the improved ride comfort of a vehicle.

The present invention is not limited to the above-described embodiments only, and any arbitrary combinations or rearrangement, as appropriate, of the aforementioned constituting elements are all effective as the embodiments of the present invention. It is understood by those skilled in the art that various modifications such as changes in design may be added to the embodiments based on their knowledge and the embodiments added with such modifications are also within the scope of the present invention. The structure shown for each Figure is for illustrative purposes only and may be changed, as appropriate, as long as the similar functions can be attained and the similar advantageous effects can also be achieved.

Figure 9:
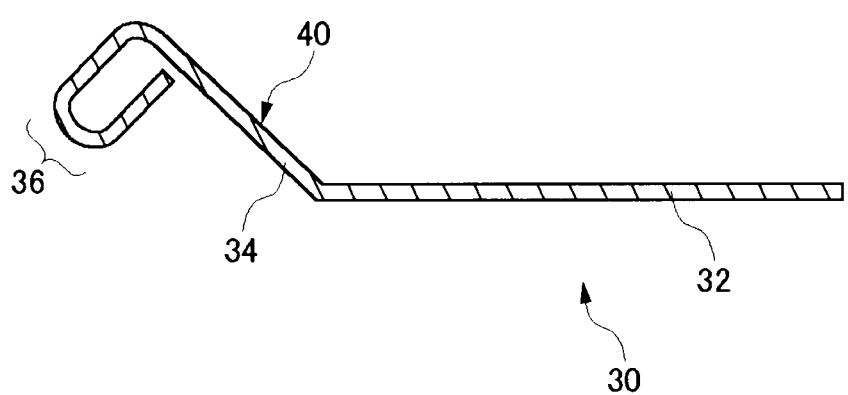
FIG. 9 is a schematic cross-sectional view showing a part of an inner plate in a viscous coupling according to a modification.

For example, as shown in FIG. 9, an end of the movable plate 40 on an open-end side may be bent. FIG. 9 is a schematic cross-sectional view showing a part of an inner plate in the viscous coupling according to a modification. That is, the end of the movable plate 40 on the open-end side is folded back and hence double-structured, thereby forming a weight portion 36. Forming the weight portion 36 into such a shape allows the weight portion 36 to be formed more easily and therefore achieves a simple manufacture of the viscous coupling 10. Also, the shape of the weight portion 36 is not particularly limited thereto as long as the end of the movable plate 40 on the open-end side is heavier than that on the coupled-end side. For example, the outer end of the movable plate 40 may constitute the weight portion 36 by forming a shape of the weight portion 36 in a manner such that the thickness thereof increases gradually or continuously from the end of the movable plate 40 on the coupled-end side toward the end thereof on the open-end side. The end of the movable plate 40 on the open-end side may be heavier than the end thereof on the coupled-end side by using the weight portion 36 formed of a material whose density is higher than the material constituting the inclined portion 34.

Though, in each of the above-described embodiments a thinner portion is formed by a constricted portion, a dent may be provided on one of the faces thereof so as to form the thinner portion. Further, the structure is not limited to the provision of a thinner portion and, for example, part of the inner plate 30 may be made flexible so that the movable plate 40 can be displaced with this part thereof serving as a fulcrum. Also, the minor plate 38 may be provided around the whole circumference encircling the shaft 20, and may be formed such that the thickness of the minor plate 38 varies gradually or continuously and the thickness of a part thereof disposed counter to the protruding portion 58 becomes thickest when the angle of rotation of the shaft 20 is in a marginal region of rotation range.

In each of the above-described embodiments, the movable plates 40 are formed such that they are divided by the slits 70. In a modification, a movable plate 40 may be formed in an outer plate 50 according to the desired suspension characteristics. This modification can also adjust the damping force in response to the differential rotation speed of the shaft 20 and the case body 12. In each of the above-described embodiments, the movable plate 40 is provided around the whole circumference encircling the shaft 20. In another modification, the movable plate 40 may be provided around the shaft at a predetermined region.

INDUSTRIAL APPLICABILITY

The present invention can be used in a suspension apparatus.

What is claimed is:

1. A viscous coupling comprising:
   a case body for forming a working chamber which contains a viscous fluid;
   a shaft inserted into the case body, the shaft being relatively rotatable with respect to the case body;
   a plurality of first plates coupled to the shaft; and
   a plurality of second plates coupled to the case body and disposed in the working chamber, the second plates being spaced apart from the first plates with a pitch therebetween in an axial direction of the shaft,
   wherein the pitch between the first plates and the second plates is adjustable by deforming either of the first plates and the second plates in response to the rotation speed of the shaft or the case body,
   wherein each first plate has an inclined portion, the inclined portion being inclined in the axial direction as viewed in a cross-section parallel to an axis of the shaft, and a region including an open end and the inclined portion of each first plate has a plurality of movable plates divided by slits extending radially with the shaft as a center thereof,
   wherein an end portion on an open-end side of each movable late has a greater mass than an end portion on a coupled-end side thereof,
   wherein each second plate has a region opposite to the inclined portion of each first plate, the region extending in parallel to the inclined portion of each first plate, and
   wherein the pitch varies in response to a deformation of the movable plates under a force working thereon by the rotation of the shaft or the case body.

2. The viscous coupling according to claim 1, wherein the first plate has a thinner portion extending in a direction about the axis of the shaft within a range where the slits extend.

3. The viscous coupling according to claim 1, wherein when the shaft and the case body are not rotating, the pitch between the first plate and one of the two neighboring second plates is narrower than that between the first plate and the other of the second plates.

4. The viscous coupling according to claim 1, wherein the end portion on the open-end side of the movable plates is such that one of end faces thereof in the rotational direction of the inner plate is larger in area than the other thereof.

5. The viscous coupling according to claim 1, wherein the end portion on an open-end side of the movable plate is bent.

6. The viscous coupling according to claim 1, wherein the first plate includes a minor plate provided integrally with or separately from a region on a shaft side of an open end of the second plate,
   wherein the second plate includes a protruding portion which protrudes toward the shaft from the open end, and
   wherein the protruding portion faces the minor plate with a pitch narrower than the pitch between the first plate and the second plate.

7. The viscous coupling according to claim 6, wherein the minor plate and the protruding portion are disposed such that the minor plate and the protruding portion face each other when the angle of rotation of the shaft with respect to the case body is in a marginal region of rotation range.

8. A suspension apparatus including the viscous coupling, according to claim 1, as a damping force generating means for absorbing shocks to a vehicle when the vehicle is displaced up and down.

9. The suspension apparatus according to claim 8, wherein the first plate includes a minor plate provided integrally with or separately from a region on a shaft side of an open end of the second plate,
- wherein the second plate includes a protruding portion which protrudes toward the shaft from the open end, the protruding portion facing the minor plate with a pitch narrower than the pitch between the first plate and the second plate, and
- wherein the minor plate and the protruding portion face each other when the vehicle is in an upper-end region or a lower-end region of displacement.

10. The suspension apparatus according to claim 8,
- wherein the end portion on the open-end side of the movable plate is such that the area of an end face on a side where the end portion advances by the rotation of the shaft due to an upward displacement of the vehicle is larger than the area thereof where it advances by the rotation of the shaft due to a downward displacement thereof.

* * * * *